Jan. 19, 1937.  W. L. MORRISON  2,068,506
RADIATOR SHIELD
Filed Feb. 19, 1936    4 Sheets-Sheet 4
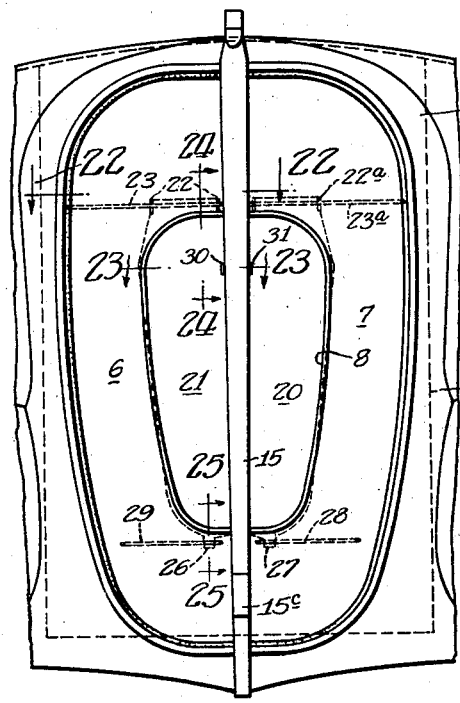
Fig. 20
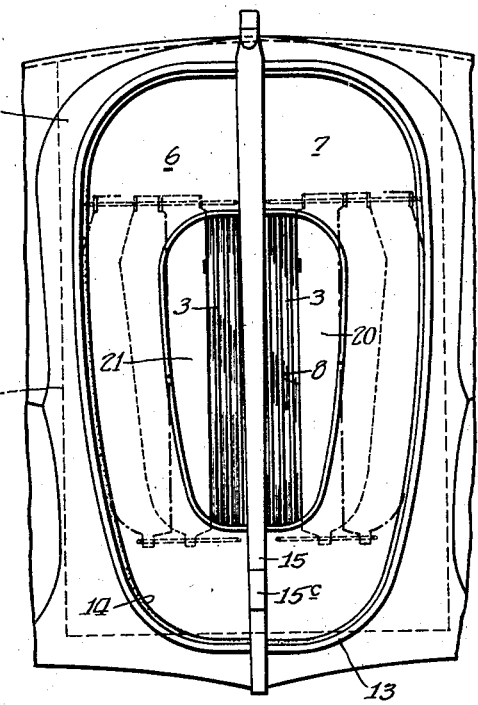
Fig. 21
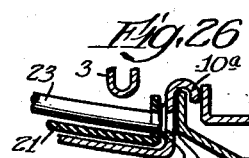
Fig. 26
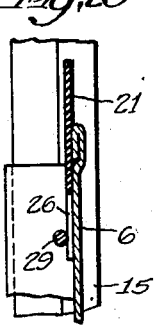
Fig. 25
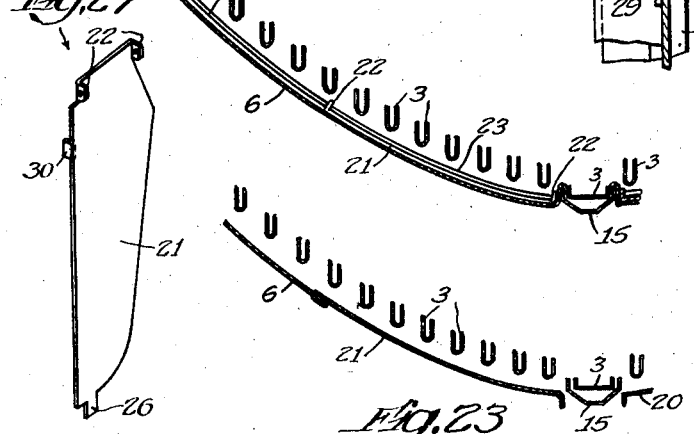
Fig. 22, Fig. 27, Fig. 23, Fig. 24
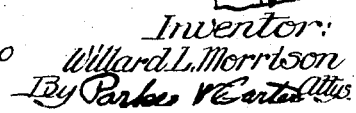
Inventor:
Willard L. Morrison
By Parker V Carter Attys Patented Jan. 19, 1937

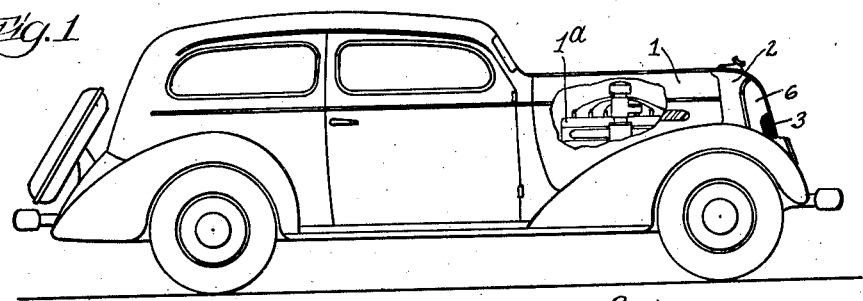
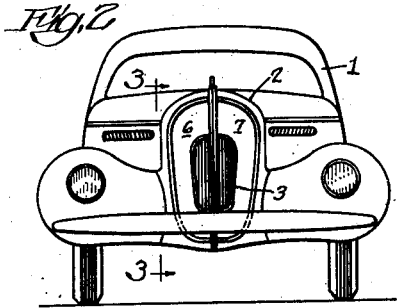
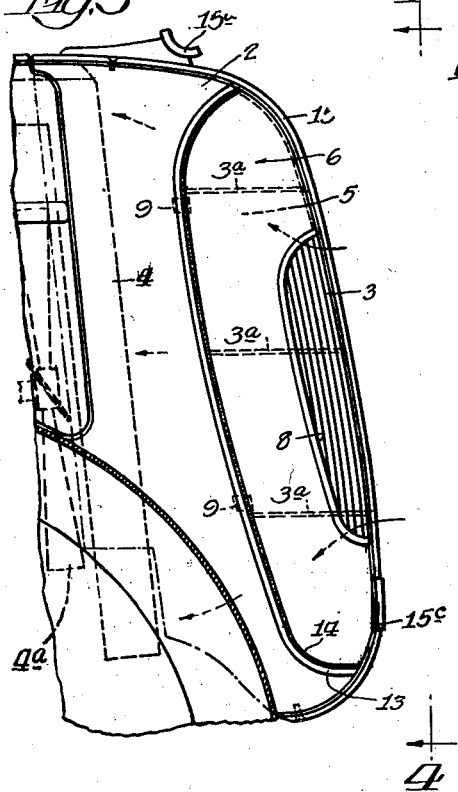
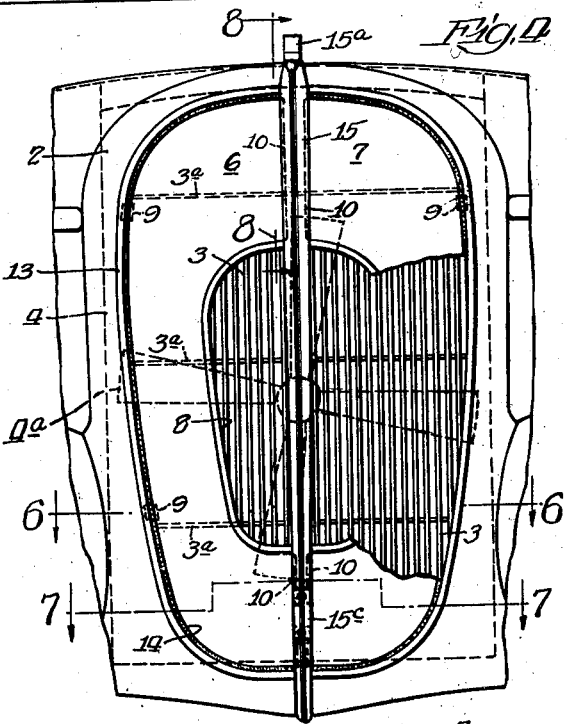
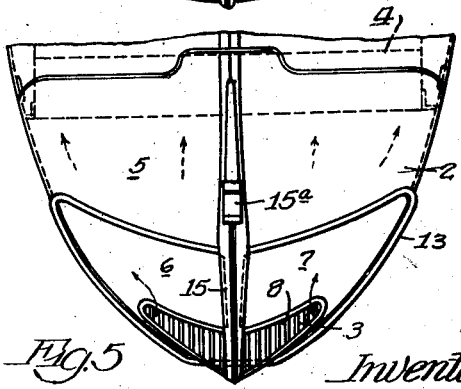

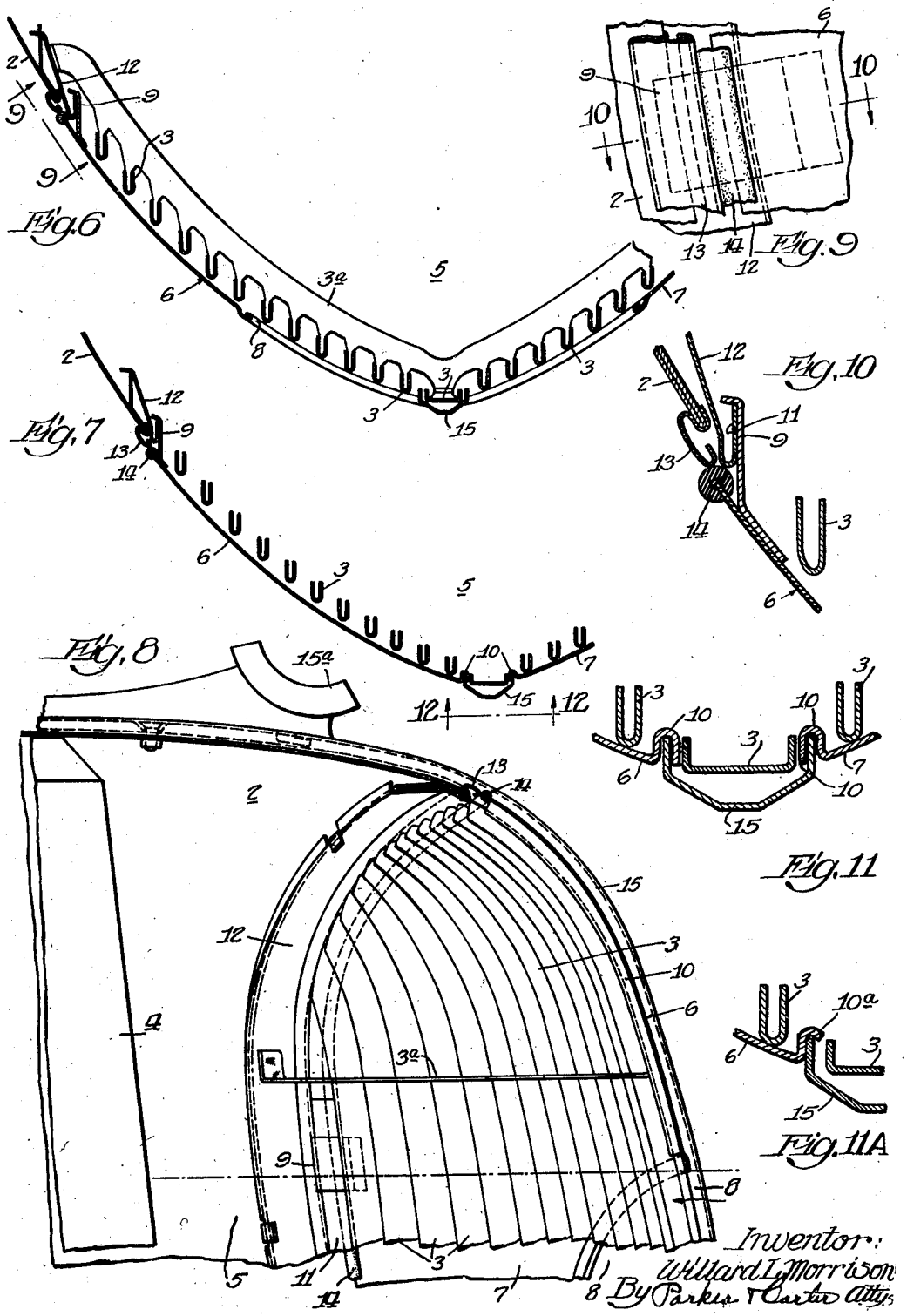

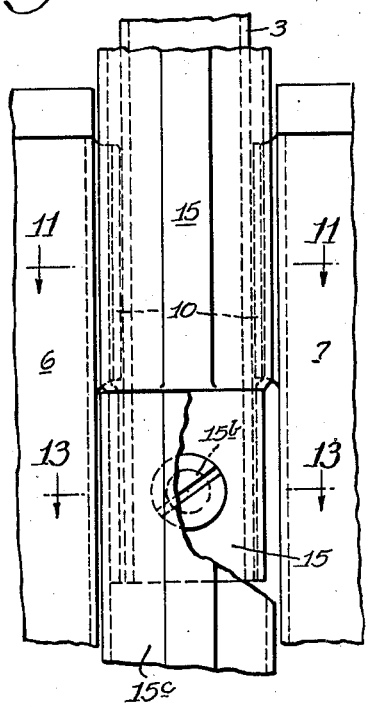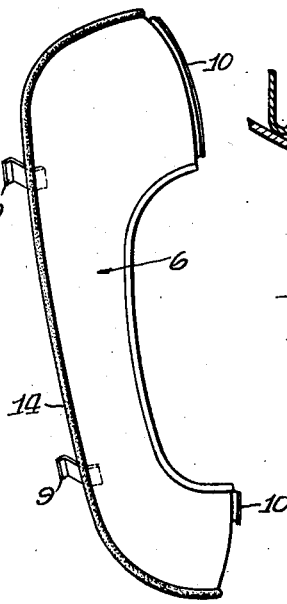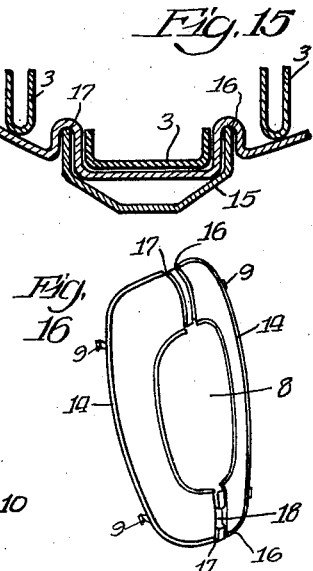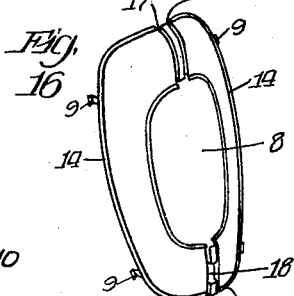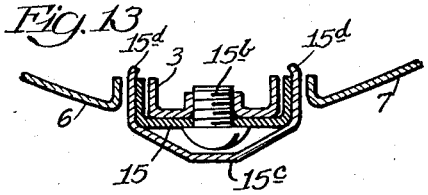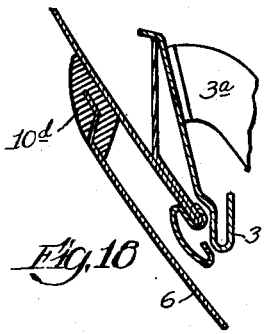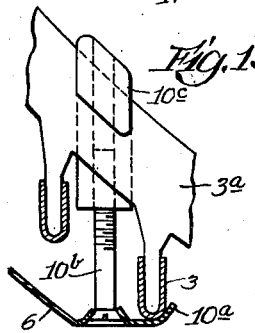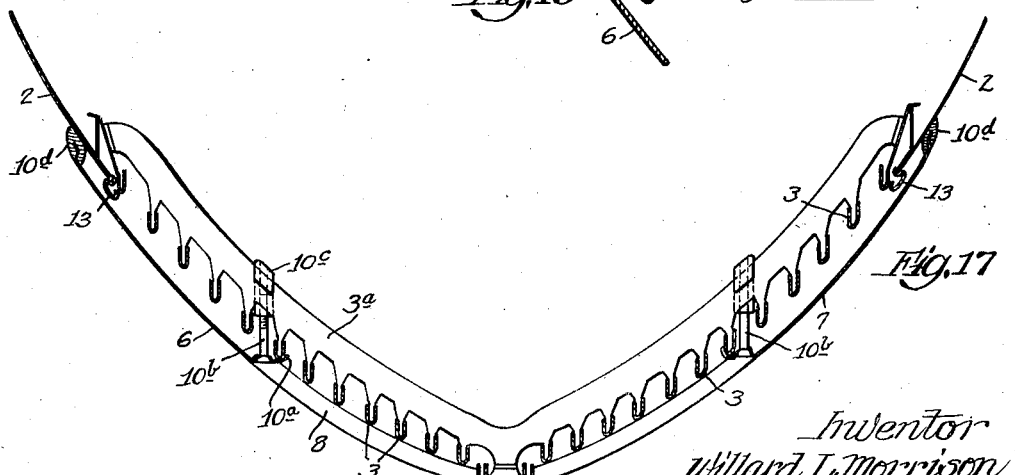

2,068,506

UNITED STATES PATENT OFFICE 2,068,506

RADIATOR SHIELD

Willard L. Morrison, Lake Forest, Ill.

Application February 19, 1936, Serial No. 64,648

5 Claims. (Cl. 257—132)

This invention relates to cooling systems for internal combustion engines and has for its object to provide a new and improved device of this description.

The invention has as a further object to provide a new and improved cooling system for the internal combustion engine of a moving vehicle, by means of which the air passing to the radiator will be regulated or controlled.

The invention has as a further object to provide a device of this description for controlling the air passing to the radiator which is arranged so that there is a hot air pocket above the opening at the front, through which the air passes.

The invention has as a further object to provide a device of this description by means of which the peripheral surface of the radiator may be shut off from the direct passage of the air and at the same time air drawn through the entire radiator.

The radiator and fan used in connection with the cooling system of internal combustion engines for vehicles are made of a proper size for summer use and they are too large for winter use. One of the objects of the present invention is to adapt this large radiator and fan for winter use.

The invention has as a further object to reduce the air drawing effect of the fan without reducing either its size or the cross sectional area of the radiator through which air is drawn.

The invention has as a further object to provide means by which the entire radiator is utilized, but means is provided for reducing the effectiveness of the peripheral part of the radiator without reducing the size of the fan or the speed thereof.

The invention has as a further object to provide means whereby hot air may be stored in a hot air pocket at the upper part of the radiator. The invention has further objects which are more particularly pointed out in the accompanying description.

Referring now to the drawings, Fig. 1 is a side elevation of a vehicle having an internal combustion engine with one form of my improved cooling system;

Fig. 2 is a front elevation of the device shown in Fig. 1;

Fig. 3 is an enlarged view of the right hand end of Fig. 1, with parts removed;

Fig. 4 is a fragmentary front view taken on line 4—4 of Fig. 3;

Fig. 5 is a top view of Fig. 4;

Fig. 6 is an enlarged sectional view with parts broken away, taken on line 6—6 of Fig. 4;

Fig. 7 is an enlarged sectional view with parts broken away, taken on line 7—7 of Fig. 4;

Fig. 8 is an enlarged sectional view of the upper portion of the radiator and associated parts taken on line 8—8 of Fig. 4;

Fig. 9 is an enlarged fragmentary elevational view of one of the fastening clips and taken on line 9—9 of Fig. 6;

Fig. 10 is a sectional view taken on line 10—10 of Fig. 9;

Fig. 11 is a sectional view with parts broken away, taken on line 11—11 of Fig. 12;

Fig. 11—A is a view similar to Fig. 11, but showing a modified construction;

Fig. 12 is an enlarged fragmentary view with parts broken away, of the lower central portion of Fig. 4;

Fig. 13 is a sectional view taken on line 13—13 of Fig. 12;

Fig. 14 is a perspective view of one of the closure elements;

Fig. 15 is a sectional view similar to Fig. 13, but showing a modified construction;

Fig. 16 is a perspective view on a reduced scale, wherein the closure elements are connected to form a unit;

Fig. 17 is a view similar to Fig. 6 but showing a modified construction;

Figs. 18 and 19 are enlarged details of the left hand portion of Fig. 17;

Fig. 20 is a view similar to Fig. 4, showing a modified construction having the opening adjustable;

Fig. 21 is a view similar to Fig. 20, but showing the opening partially closed;

Fig. 22 is an enlarged sectional view taken on line 22—22 of Fig. 20;

Fig. 23 is an enlarged sectional view taken on line 23—23 of Fig. 20;

Fig. 24 is an enlarged sectional view taken on line 24—24 of Fig. 20;

Fig. 25 is an enlarged sectional view taken on line 25—25 of Fig. 20;

Fig. 26 is an enlarged fragmentary detail of the right hand portion of Fig. 22, with parts broken away;

Fig. 27 is a perspective view of one of the movable closure elements shown in Figs. 20 and 21.

Like numerals refer to like parts throughout the several figures.

The radiator and fan in the cooling system for internal combustion engines of vehicles are arranged of the proper size for summer use and are therefore too large for winter use. The present invention remedies this evil and permits the use of the summer radiator and fan in the winter and at the same time maintains the cooling liquid at the proper efficient temperature. In the winter time when the air is cold, if the entire front of the radiator of the engine cooling system is open to the air so that this cold air is drawn through all of the radiator, the cooling liquid circulated through the water jacket of the engine becomes too cold. This reduces the efficiency of the engine and also reduces the efficiency of the water for vehicle body heating purposes. By means of the present device, I provide an inexpensive, efficient and decorative arrangement by means of which the air passing to the radiator may be regulated and controlled, so as to secure the desired result.

Referring now to the drawings which show certain forms of the invention, there is illustrated a vehicle 1 having an internal combustion engine 1a with a cooling system including a radiator 4 and a fan 4a and a radiator shell 2. I have also illustrated the vehicle as having a grille 3 a considerable distance in front of the radiator 4 so as to provide a chamber 5 between it and the radiator throughout the entire front area of the radiator. I provide means for partially closing the summer opening in the front end of the vehicle to limit the amount of air passing to the radiator. In the construction shown I have provided a closure which may be made in two parts 6 and 7, which are attached to the front of the vehicle in any desired manner, and which provides a central opening 8 less in size than the diameter of the fan and through which air may pass into the radiator. Any desired manner of attaching the closure in position may be used. As herein shown, I provide a series of clips 9 at the edges of the closure, by means of which it is attached in position. The two opposed parts of the closure elements are provided with fastening flanges 10. I have illustrated this construction to be used where a grille 3 is applied to the opening at the front of the vehicle. In this construction, as illustrated for example in Figs. 6 and 7, the closure element is brought to an angular position in front of the vehicle. The clips 9 are inserted through the grille and engage the member 12. This member 12 is bent into a loop, as shown in Fig. 10, and it is the looped end 11 which is engaged by the clip 9. There is a central vertical member 15 and the fastening flanges 10 are moved into position, as shown in Fig. 11, and the member 15 has its edges placed in the groove in these fastening flanges, as shown in this figure, and member 15 is then fastened to the body of the vehicle. The closure elements are preferably provided with a non-metallic edge 14 which engages the fixed parts, as shown for example in Figs. 6, 7 and 10, and prevents the marring of these parts. Instead of having the fastening device 10 looped, as shown in Fig. 11, the end may be simply bent as shown at 10a, Fig. 11—A, and then this end can be inserted under the edge of piece 15 while said piece 15 is in position. The piece 15 is shown extending up along the top as illustrated in Fig. 8 and it may have the ornament 15a attached thereto. It is removably held in place by screws, bolts or other fastening devices 15b. There are cross members 3a, which when a grille is used prevent the grille from being bent inwardly. This piece 15 has a removable section 15c opposite the opening for the end of the crank used in starting the engine when the starter does not work and which has bent ends 15d which snap over the edges of the part, as shown in Fig. 13.

Instead of having the clips for fastening the closure device to the grille, I may fasten it to the grille frame 3a by means of the members 10c which hook over the grille frame 3a, there being the screws 10b connected with the closure device 6 which have their threaded ends inserted in threaded openings in the member 10c, see Fig. 19. In this construction there would also be a non-metallic member 10d to prevent marring of the parts of the vehicle.

Instead of having the closure device made in sections 6 and 7 it may be made in a single piece, as shown in Fig. 16. In this case there would be at the center of it a groove so that the piece 15 could be received between the shoulders 16 and 17 of the grooves. There would also be opening 18 opposite where the piece 15c is provided, for the end of the crank for starting the motor.

In Figs. 20 to 24 there is illustrated a modified construction where there is means provided for regulating the size of the central opening of the closure device. In this construction there are adjustable closure members 20 and 21 which are provided at their tops with the lugs 22 and 22a having holes and into which fit rods 23 and 23a so that the closure members 20 and 21 slide along these rods to more or less close the central opening as desired. The members 20 and 21 are preferably provided with finger pieces 30 so that they can be easily moved. At the bottom these members are provided with the projections 26 which engage stops 29 back of them to hold them in position, see Figs. 20 and 25. The rods 23 may be fastened in position in any desired manner, as by being riveted at 25 to the closure members, as shown in Fig. 26, there being the enlarged part 24 between the closure members 6 and 7 and movable closure member 21, see Fig. 26.

The closure device may be used without the grille and in that event, the fastening devices fastened directly to some part of the vehicle. When so used, a grille may be placed across the central opening if desired.

It will be noted that the central opening of the closure device is reduced to a size less than the fan diameter so that it retards the fan efficiency at the outer end of the fan blades, said blades being forced to seek a supply of air from the chamber between the radiator and the closure device instead of directly through the central opening in the closure device. It is only the weak central pull of the fan that gets a direct feed of air through this central opening in the closure device. This therefore provides means for utilizing the entire radiator and at the same time reduces the air drawing effect of the fan without reducing its size or the cross sectional area of the radiator through which air is drawn.

I claim:

1. A radiator shield for automobile bodies having a radiator and an opening in front of the radiator provided with a grille, comprising a demountable closure device extending around the periphery of the grille on the outside thereof and having an opening therethrough smaller in area than the area of the face of the radiator, said closure device having a curved streamlined outer face converging toward said opening and fastening means for fastening it in position.

2. A radiator shield for automobile bodies having a radiator and an opening in front of the radiator provided with a grille, comprising a demountable closure device extending around the periphery of the grille on the outside thereof and having an opening therethrough smaller in area than the area of the face of the radiator, said closure device having a curved streamlined outer face converging toward said opening and fastening means for fastening it in position, the rearmost portion of said closure device being forward of the most forward portion of the radiator.

3. A radiator shield for automobile bodies having a radiator and an opening in front of the radiator provided with a grille, comprising a demountable closure device extending around the periphery of the grille on the outside thereof and having an opening therethrough smaller in area than the area of the face of the radiator, said closure device having a curved streamlined outer face converging toward said opening and concealed fastening devices attached to said closure device for fastening it in position.

4. A radiator shield for automobile bodies having an engine, a radiator and a fan, comprising a generally annular demountable closure device on the front of the automobile body having a curved stream line wall with an opening therethrough, smaller in area than the area of the front of the radiator, the curved wall converging in direction away from the radiator toward said opening, said wall located in front of a peripheral portion of the radiator and the outer ends of the blades of the fan, so as to shield said peripheral portion of the radiator and the outer ends of the blades of the fan from direct straight line air currents, said wall spaced away from the radiator so as to form an air chamber around the opening, and between the wall and the radiator, so that a portion of the air entering said opening is deflected by the pull of the ends of the blades of the fan, toward said ends whereby the amount of air entering the radiator is reduced and a more even distribution of the air through the radiator is secured.

5. A radiator shield for automobile bodies having an engine, a radiator, a grille, and a fan, comprising a generally annular demountable closure device on the outside of the grille and having a curved stream line wall with an opening therethrough, smaller in area than the area of the front of the radiator, the curved wall converging in direction away from the radiator toward said opening, said wall located in front of a peripheral portion of the radiator and the outer ends of the blades of the fan, so as to shield said peripheral portion of the radiator and the outer ends of the blades of the fan from direct straight line air currents, said wall spaced away from the radiator so as to form an air chamber around the opening, and between the wall and the radiator, so that a portion of the air entering said opening is deflected by the pull of the ends of the blades of the fan, toward said ends, whereby the amount of air entering the radiator is reduced and a more even distribution of the air through the radiator is secured, and fastening devices attached to the closure device which extend through the grille to fasten the closure device in position.

WILLARD L. MORRISON.